US011893921B2

(12) United States Patent
Kim et al.

(10) Patent No.: US 11,893,921 B2
(45) Date of Patent: Feb. 6, 2024

(54) DATA PROCESSING DEVICE AND DATA DRIVING DEVICE FOR DRIVING DISPLAY PANEL, AND DISPLAY DEVICE

(71) Applicant: SILICON WORKS CO., LTD., Daejeon (KR)

(72) Inventors: Do Seok Kim, Daejeon (KR); Yong Hwan Mun, Daejeon (KR); Young Soo Ryu, Daejeon (KR)

(73) Assignee: SILICON WORKS CO., LTD., Daejeon (KR)

( * ) Notice: Subject to any disclaimer, the term of this patent is extended or adjusted under 35 U.S.C. 154(b) by 0 days.

(21) Appl. No.: 18/080,648

(22) Filed: Dec. 13, 2022

(65) Prior Publication Data

US 2023/0114906 A1 Apr. 13, 2023

Related U.S. Application Data

(63) Continuation of application No. 17/383,379, filed on Jul. 22, 2021, now Pat. No. 11,557,238.

(30) Foreign Application Priority Data

Jul. 23, 2020 (KR) ........................ 10-2020-0091581

(51) Int. Cl.
*G09G 3/20* (2006.01)

(52) U.S. Cl.
CPC ....... *G09G 3/20* (2013.01); *G09G 2310/0243* (2013.01); *G09G 2310/0275* (2013.01); *G09G 2310/08* (2013.01); *G09G 2370/00* (2013.01)

(58) Field of Classification Search
CPC ............. G09G 3/20; G09G 2310/0243; G09G 2310/0275; G09G 2310/08; G09G 2370/00
See application file for complete search history.

(56) References Cited

U.S. PATENT DOCUMENTS

2018/0158424 A1* 6/2018 Okamoto ............... G09G 5/008

* cited by examiner

*Primary Examiner* — Gerald Johnson
(74) *Attorney, Agent, or Firm* — ROTHWELL, FIGG, ERNST & MANBECK, P.C.

(57) ABSTRACT

According to an embodiment, both the high-speed communication and the low-speed communication are performed using a single communication line, thereby reducing limitations on wiring on a PCB and increasing the utilization efficiency of a transmission line.

20 Claims, 11 Drawing Sheets

| ITEM | frequency | Time (/2048) | CNT (50MHz) |
|---|---|---|---|
| TRP1 | 6Gbps | 341ns | 17.1 |
| | 5Gbps | 409.6ns | 20.5 |
| TRP2 | 6Gbps | 1364ns | 68.2 |
| | 5Gbps | 1638.4ns | 81.9 |

DATA PROCESSING DEVICE AND DATA DRIVING DEVICE FOR DRIVING DISPLAY PANEL, AND DISPLAY DEVICE

CROSS REFERENCE TO RELATED APPLICATION

This application is a continuation application of U.S. patent application Ser. No. 17/383,379 filed on Jul. 22, 2021, which claims priority from Republic of Korea Patent Application No. 10-2020-0091581, filed on Jul. 23, 2020, all of which are hereby incorporated by reference in its entirety.

BACKGROUND

1. Field of Technology

The present disclosure relates to a technology for driving a display device.

2. Description of the Prior Art

In general, a display panel of a display device is composed of a plurality of pixels arranged in a matrix form, and each pixel is composed of red (R), green (G), and blue (B) subpixels. In addition, an image is displayed on the display panel while each subpixel is emitting light with a grayscale according to image data.

Here, the display device may include a data processing device called a timing controller and a data driving device called a source driver, and the image data is transmitted from the data processing device to the data driving device. The image data is transmitted as a digital signal, and the data driving device converts the image data received as the digital signal into an analog voltage to drive each pixel.

On the other hand, the data processing device and the data driving device can perform data communication with only one clock frequency. The data processing device and the data driving device may be composed of a communication circuit optimized for the one clock frequency. Since the communication circuit mainly supports high-speed communication, the data processing device and the data driving device can also be optimized for high-speed communication.

However, since the data processing device and data driving device optimized for high-speed communication only support high-speed communication, it may be difficult to perform both high-speed communication and low-speed communication.

In this regard, the present embodiment is to provide a technology for a data processing device and a data driving device capable of performing both low-speed communication and high-speed communication using a single line.

SUMMARY OF THE INVENTION

In this background, an aspect of the present disclosure is to provide a technology for performing configuration for receiving image data with respect to a communication circuit when receiving a first pattern signal having a first frequency and controlling the communication circuit to terminate the configuration when receiving a second pattern signal having a second frequency lower than the first frequency.

Another aspect of the present disclosure is to provide a technology for performing both high-speed communication and low-speed communication using a single communication line.

To this end, in an aspect, the present disclosure provides a data driving device for configuring a communication circuit for reception of image data before receiving the image data, the data driving device may comprise: an identification circuit configured to receive a first pattern signal having a first frequency and a second pattern signal having a second frequency different from the first frequency and to distinguish the first pattern signal and the second pattern signal; and a controlling circuit configured to configure the communication circuit when the first pattern signal is received and to terminate the configuration of the communication circuit when the second pattern signal is received.

The data driving device may further include an oscillator configured to generate a counting clock for counting a clock, wherein the identification circuit further includes a divider configured to generate a first division clock from the first pattern signal and a second division clock from the second pattern signal and a counter configured to respectively count the first division clock and the second division clock using the counting clock to generate a first count value and a second count value, and the controlling circuit recognizes the first pattern signal and the second pattern signal respectively according to the first count value and the second count value.

The first count value may be smaller than the second count value.

The controlling circuit may receive one count value generated from the counter and determine the one count value as the first count value or as the second count value when the one count value is in a predetermined range.

The controlling circuit may receive a plurality of count values and determines a count value which is continuously repeated among the plurality of count values as the first count value or the second count value.

The communication circuit may perform a high-speed data communication according to a first protocol and a low-speed data communication according to a second protocol through a same communication line.

The identification circuit may operate in the high-speed data communication without operating in the low-speed data communication.

The data driving device may further comprise a lock controlling circuit configured to generate a lock signal indicating a state of a clock for the high-speed data communication and to change a voltage level of the lock signal when the clock is broken, wherein the controlling circuit changes a mode from a mode for the high-speed data communication to a mode for the low-speed data communication when the voltage level of the lock signal is changed after clock training has been completed in the high-speed data communication.

The controlling circuit may set a communication frequency of the communication circuit as the first frequency when the first pattern signal is received, and terminate the setting of the communication frequency when the second pattern signal is received.

The data driving device may further include: an equalizer, wherein, when the second pattern signal is received, the controlling circuit terminates the setting of the communication frequency of the communication circuit and starts changing the configuration of the equalizer.

When the second pattern signal is not received within a predetermined time, the controlling circuit may enter a display mode for receiving the image data.

In another aspect, the present disclosure provides a data processing device, that prepares transmission of image data in a preparation mode prior to a display mode for transmitting the image data to a data driving device, comprising: a transmitting circuit configured to transmit a signal, comprising a first pattern signal having a first frequency and a second pattern signal having a second frequency different from the first frequency, to the data driving device, wherein the data driving device optimizes configuration of a communication circuit according to the signal, the first pattern signal indicates the start of the signal, and the second pattern signal indicates the end of the signal.

The preparation mode may include a high-speed mode, in which a high-speed data communication according to a first protocol, established between the data processing device to transmit the image data and the data driving device to receive the image data, is possible, and a low-speed mode, in which a low-speed data communication according to a second protocol different from the first protocol, is possible, and the data processing device may further comprise an oscillator configured to generate a clock for synchronizing the image data in the high-speed mode.

The data processing device may further comprise a controlling circuit configured to convert the image data to have a serial form and to encode the first pattern signal or the second pattern signal into a DC balance code.

In still another aspect, the present disclosure provides a display device comprising: a data processing device configured to transmit an equalizer (EQ) training signal comprising a first pattern signal having a first frequency and a second pattern signal having a second frequency different from the first frequency; and a data driving device, comprising an equalizer, to receive the first pattern signal and the second pattern signal, to start a test for one configuration of the equalizer when the first pattern signal is identified, and to terminate the test for the one configuration of the equalizer when the second pattern signal is identified.

The data processing device may transmit the EQ training signal in a plurality of time sections, and the data driving device may perform a test on each configuration by changing the configuration of the equalizer in each time section.

The EQ training signal may include pseudo random binary sequence (PRBS) data, and the data driving device calculates a bit error rate for the PRBS data and evaluates performance of the one configuration of the equalizer according to the bit error rate.

When a final second pattern signal is identified, the data driving device may terminate the test on the equalizer.

When the first pattern signal is not identified within a predetermined time, the data driving device may enter a display mode for receiving image data.

When the second pattern signal is not identified within a predetermined time, the data driving device may enter a display mode for receiving image data and output a lock signal indicating unlocking.

As described above, according to the present disclosure, it is possible to reduce limitations on wiring on a PCB by performing both the high-speed communication and the low-speed communication using one communication line. In addition, according to present disclosure, it is possible to increase utilization efficiency of a transmission line by performing both the high-speed communication and the low-speed communication using one communication line.

DETAILED DESCRIPTION OF THE EXEMPLARY EMBODIMENTS

Figure 1:
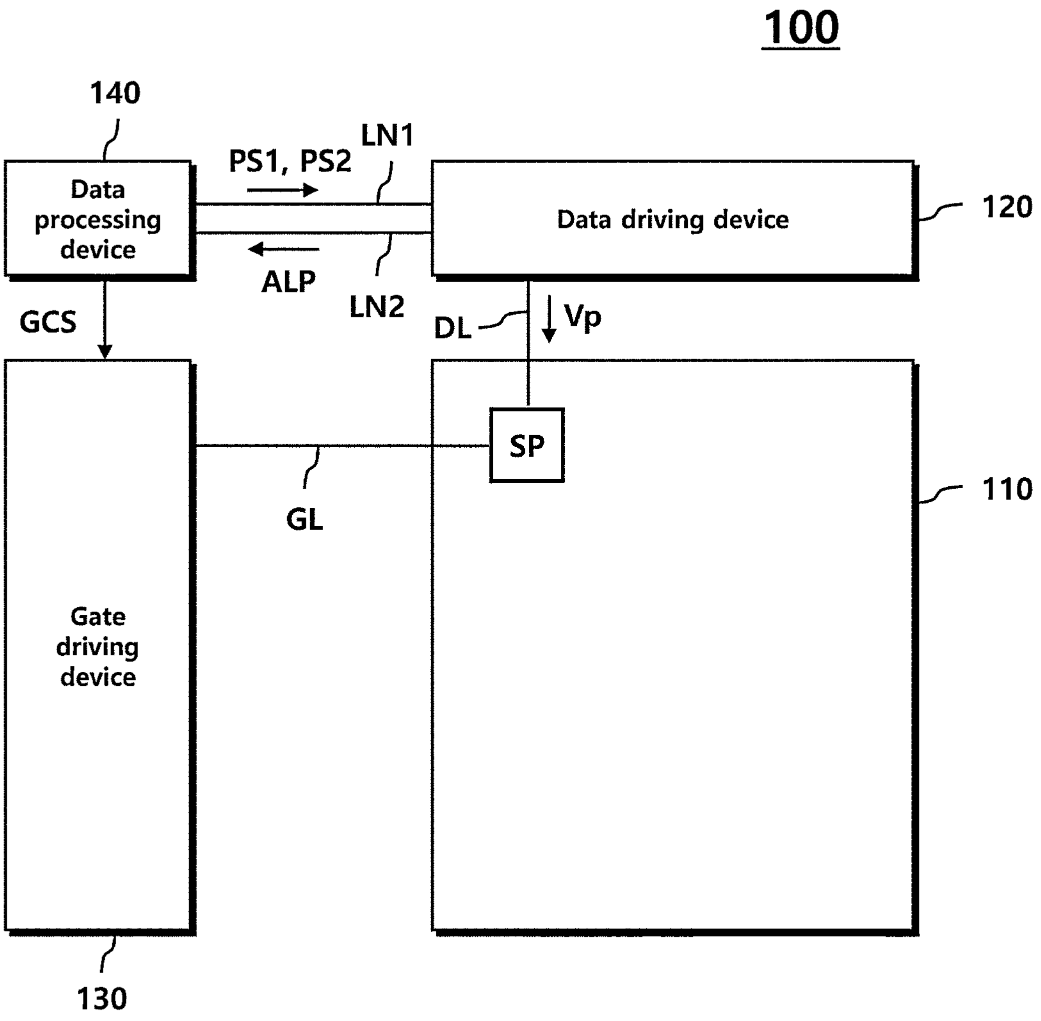
FIG. 1 is a block diagram illustrating a display device according to an embodiment.

FIG. 1 is a block diagram illustrating a display device according to an embodiment.

Referring to FIG. 1, a display device 100 may include a panel 110, a data driving device 120, a gate driving device 130, and a data processing device 140.

On the panel 110, a plurality of data lines DL and a plurality of gate lines GL may be arranged and a plurality of pixels may be arranged. A pixel may be composed of a plurality of subpixels SP. Here, the subpixel may be red (R), green (G), blue (B), white (W), or the like. One pixel may be composed of subpixels SP of RGB, subpixels SP of RGBG, or subpixels SP of RGBW. Hereinafter, for convenience of description, it will be described that one pixel is composed of subpixels of RGB.

The data driving device 120, the gate driving device 130, and the data processing device 140 are devices that generate signals for displaying an image on the panel 110.

The gate driving device 130 may supply a gate driving signal of a turn-on voltage or a turn-off voltage to a gate line GL. When the gate driving signal of the turn-on voltage is supplied to the subpixel SP, the subpixel SP is connected to a data line DL. Next, when the gate driving signal of the turn-off voltage is supplied to the subpixel SP, the connection between the subpixel SP and the data line DL is released. The gate driving device 130 may be referred to as a gate driver.

The data driving device 120 may supply a data voltage Vp to the subpixel SP through the data line DL. The data voltage Vp supplied to the data line DL may be supplied to the subpixel SP according to the gate driving signal. The data driving device 120 may be referred to as a source driver.

The data driving device 120 may include at least one integrated circuit, and the at least one integrated circuit may be of a tape automated bonding (TAB) type or a chip on glass (COG) type. The at least one integrated circuit may be connected to a bonding pad of the panel 110 or directly formed on the panel 110, or may be integrated on the panel 110 according to an embodiment. In addition, the data driving device 120 may be implemented as a chip on film (COF) type.

The data processing device 140 may supply a control signal to the gate driving device 130 and the data driving device 120. For example, the data processing apparatus 140 may transmit a gate control signal GCS for starting a scan to the gate driving device 130. In addition, the data processing device 140 may output image data to the data driving device 120. Also, the data processing device 140 may transmit a data control signal for controlling the data driving device 120 to supply a data voltage Vp to each subpixel SP. The data processing device 140 may be referred to as a timing controller.

Figure 2:
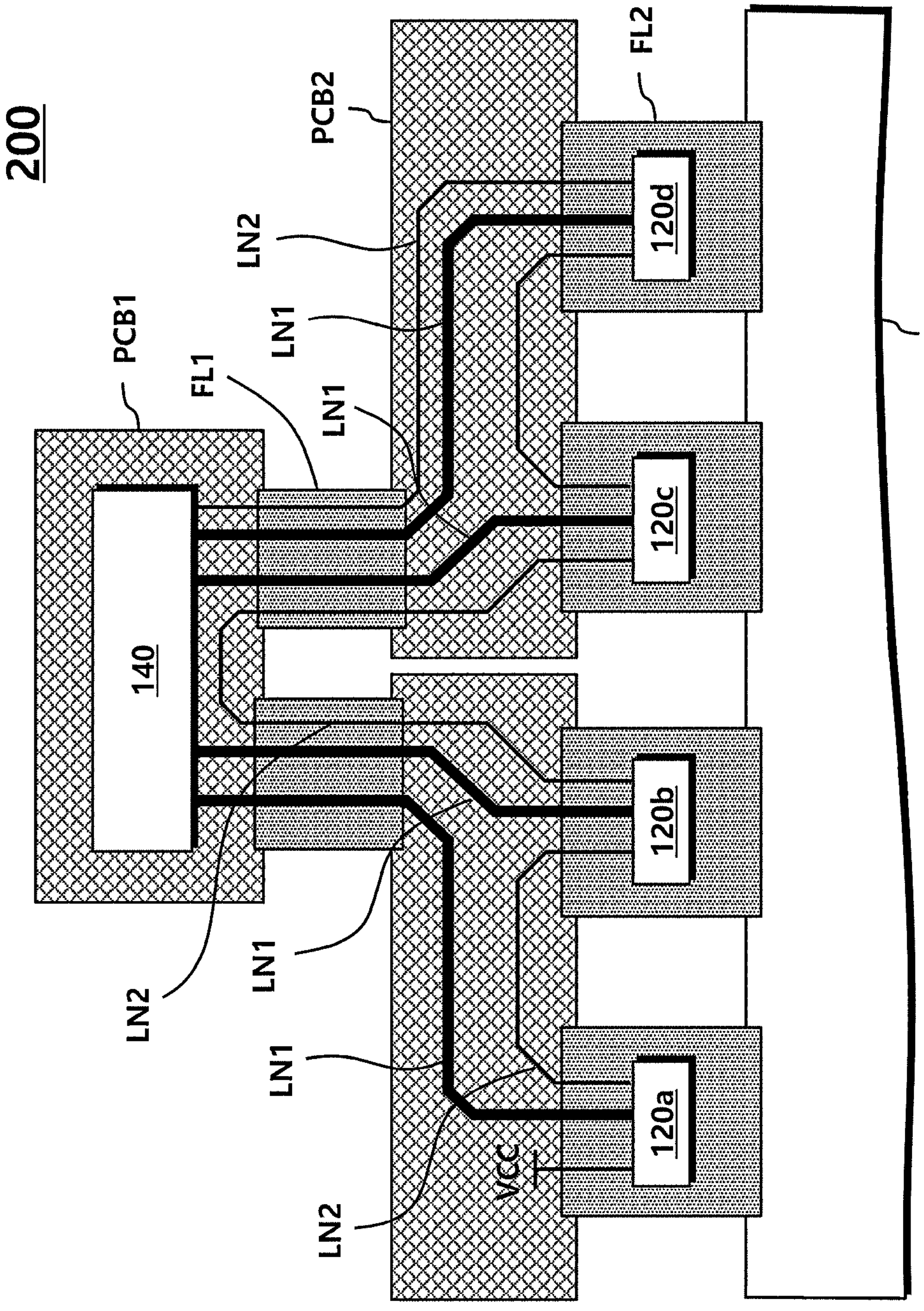
FIG. 2 is a block diagram illustrating a system according to an embodiment.

FIG. 2 is a block diagram illustrating a system according to an embodiment.

Referring to FIG. 2, the system 200 may include at least one data processing device 140 and a plurality of data driving devices 120*a*, 120*b*, 120*c*, and 120*d*.

The data processing device 140 may be disposed on a first printed circuit board (PCB1). In addition, the data processing device 140 may be connected to the plurality of data processing devices 120*a*, 120*b*, 120*c*, and 120*d* through a first communication line LN1 and a second communication line LN2.

The first communication line LN1 and the second communication line LN2 may reach the plurality of data processing devices 120*a*, 120*b*, 120*c*, and 120*d* via the first PCB PCB1 and a second PCB PCB2.

The first PCB PCB1 and the second PCB PCB2 can be connected by a first film FL1 made of a flexible material, the first communication line LN1 and the second communication line LN2 may extend from the first PCB PCB1 to the second PCB PCB2 via the first film FL1.

Each of the data processing devices 120*a*, 120*b*, 120*c*, and 120*d* may be disposed on a second film FL2 in the form of a chip-on-film (COF). The second film FL2 may be a support substrate made of a flexible material that connects the second PCB PCB2 and the panel 110, and the first communication line LN1 and the second communication line LN2 may extend from the second PCB PCB2 to each of the data processing devices 120*a*, 120*b*, 120*c*, and 120*d* via the second film FL2.

The first communication line LN1 may be connected one-to-one between the data processing device 140 and the data driving devices 120*a*, 120*b*, 120*c*, and 120*d*. In addition, the second communication line LN2 may be connected to each of the data driving devices 120*a*, 120*b*, 120*c*, and 120*d* or connected between the data driving device 120*d* and the data processing device 140 while does not overlap the first communication line LN1 in a plan view. For example, the first data driving device 120*a* may be connected to the second data driving device 120*b* through the second communication line LN2, and the second data driving device 120*b* may be connected to the third data driving device 120*c* through the second communication line LN2.

Here, the second data driving device 120*b* and the third data driving device 120*c* may be connected to different second PCBs PCB2. Accordingly, the second communication line LN2 disposed therebetween may connect the second data driving device 120*b* and the third data driving device 120*c* via the second PCB PCB2, the first film FL1, and the first PCB PCB1. The third data driving device 120*c* may be connected to the fourth data driving device 120*d* through the second communication line LN2, and the fourth data driving device 120*d* may be connected to the data processing device 140 through the second communication line LN2.

As described above, the data processing device 140 and the data driving devices 120*a*, 120*b*, 120*c*, and 120*d* may communicate with each other through the first communication line LN1 and the second communication line LN2.

Here, a communication frequency between the data processing device 140 and the data driving devices 120*a*, 120*b*, 120*c*, and 120*d* may be not determined in advance. In other words, the communication circuits of the data driving devices 120*a*, 120*b*, 120*c*, and 120*d* may not be tuned to the communication frequency of the data processing device 140.

In an embodiment, the following configuration may be implemented for the data driving devices 120*a*, 120*b*, 120*c*, and 120*d* to adjust the configuration value of the communication circuit according to the communication frequency of the data processing device 140. The communication frequency may also be referred to as a clock frequency. The characteristics of the communication circuits of the data driving devices 120*a*, 120*b*, 120*c*, and 120*d* may be changed according to the communication frequency.

FIG. 3 is a diagram illustrating a coupling capacitor provided in a first communication line according to an embodiment.

Figure 3A:
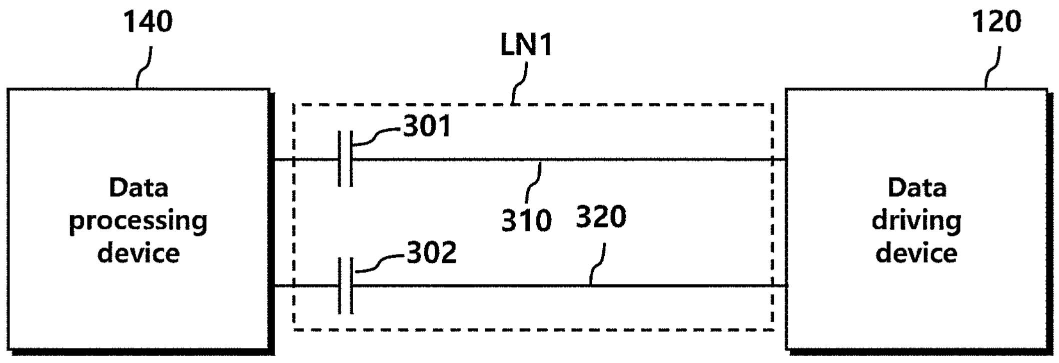
FIGS. 3A and 3B are diagrams illustrating a coupling capacitor provided in a first communication line according to an embodiment.

Referring to FIG. 3, a first communication line LN1 may include one or more AC coupling capacitors 301 and 302. Specifically, as shown in FIG. 3A, the first communication line LN1 may include a first line 310 including a first AC coupling capacitor 301 and a second line 320 including a second AC coupling capacitor 302.

Figure 3B:
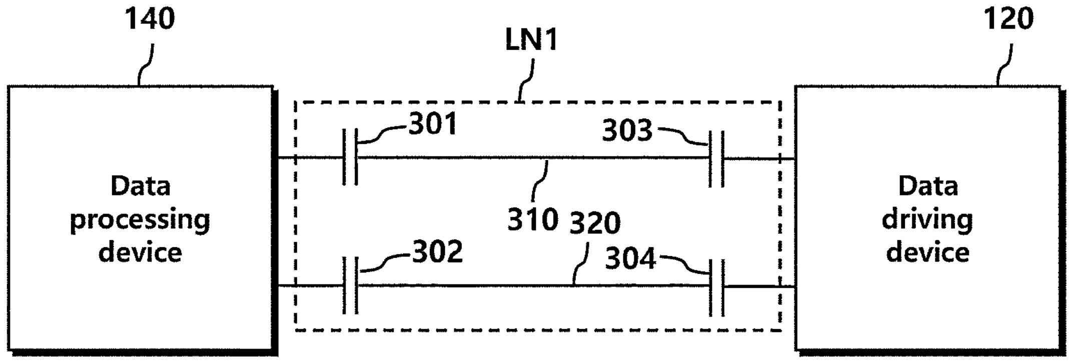

As shown in FIG. 3B, the first line 310 may further include a third AC coupling capacitor 303, and the second line 320 may further include a fourth AC coupling capacitor 304.

When the third AC coupling capacitor 303 is further included in the first line 310, the first AC coupling capacitor 301 may be disposed adjacent to the data processing device 140 in the first line 310, and the third AC coupling capacitor 303 may be disposed adjacent to the data driving device 120 in the first line 310.

When the fourth AC coupling capacitor 304 is further included in the second line 320, the second AC coupling capacitor 302 may be disposed adjacent to the data processing device 140 in the second line 320, and the fourth AC coupling capacitor 304 may be disposed adjacent to the data driving device 120 in the second line 320. By adding the third coupling capacitor 303 and the fourth coupling capacitor 304 to the first line 310 and the second line 320, the reception performance of the data driving device 120 for low-speed communication can be more improved.

Figure 4:
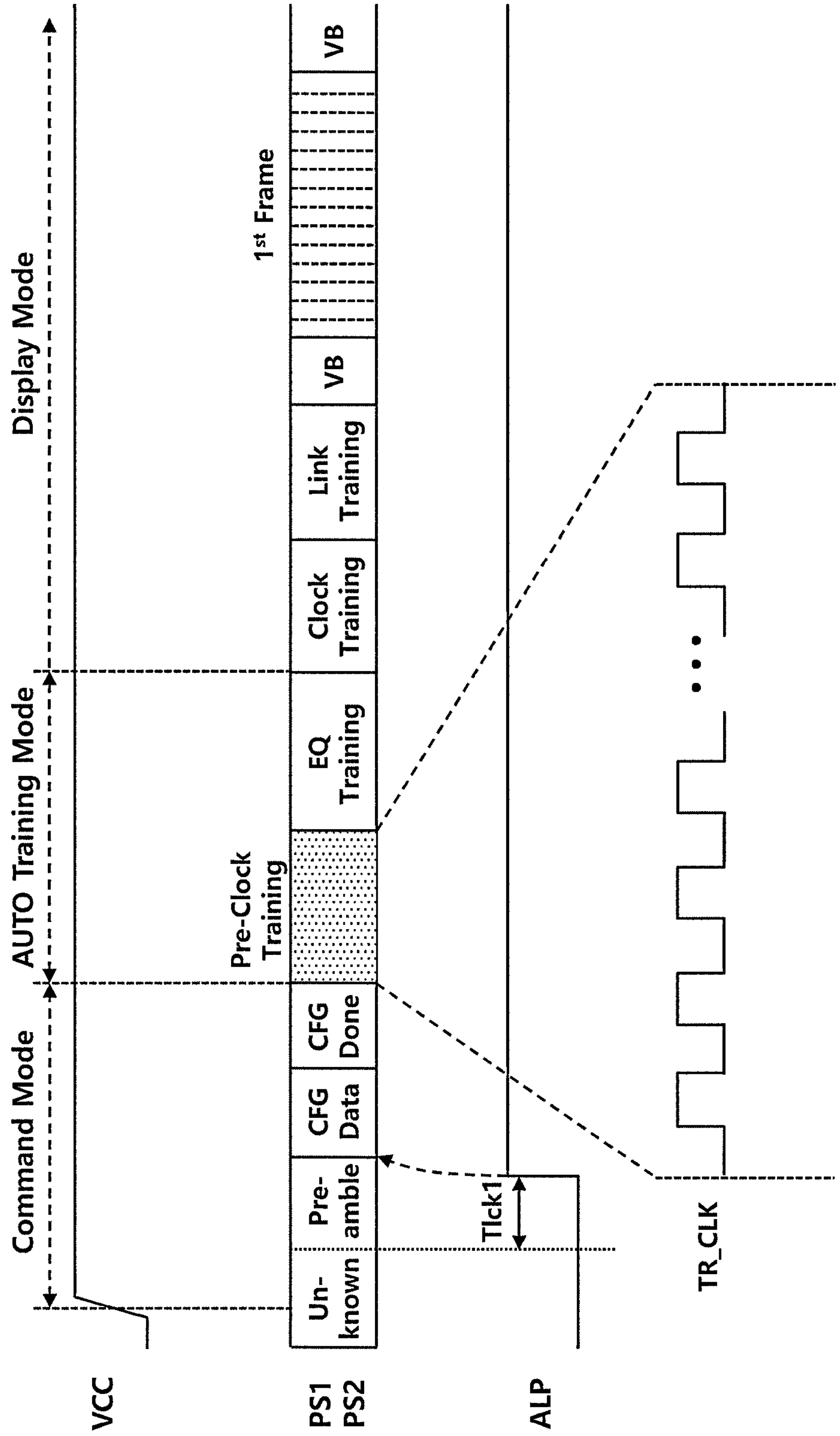
FIG. 4 is an exemplary diagram illustrating a signal sequence between a data processing device and a data driving device for explaining pre-clock training according to an embodiment.

FIG. 4 is an exemplary diagram illustrating a signal sequence between a data processing device and a data driving device for explaining pre-clock training according to an embodiment.

Referring to FIG. 4, a display device can operate in a command mode, an auto training mode, and a display mode. The command mode and auto training mode are preparation modes, and the display device may prepare to transmit and receive image data.

In the command mode, the display device can transmit configuration data for high-speed data communication in low-speed data communication. In the auto training mode, the display device may configure the communication circuit of the data driving device to operate at a frequency that enables high-speed data communication between the data processing device and the data driving device. Also, in the auto training mode, the display device may configure an equalizer for improving signal quality.

When a driving voltage VCC is supplied to the data processing device and the data driving device, in the command mode, the data processing device may transmit a second protocol signal PS2 to the data driving device. Next, the data processing device may transmit a first protocol signal PS1 in the auto training mode and the display mode. The first protocol signal PS1 and the second protocol signal PS2 may be transmitted through a first communication line (LN1 of FIG. 3).

Here, the second protocol signal PS2 is a signal based on a second protocol established between the data processing device and the data driving device, and may be a signal according to a low-speed data communication protocol. The first protocol signal PS1 is a signal based on a first protocol established between the data processing device and the data driving device, and may be a signal according to a high-speed data communication protocol.

The communication frequency of the first protocol signal PS1 may be 10 times higher than the communication frequency of the second protocol signal PS2. According to these characteristics, the first protocol signal PS1 may be classified as a high-speed data communication protocol, and the second protocol signal PS2 may be classified as a low-speed data communication protocol. Hereinafter, in order to distinguish the communication frequency of the first protocol signal PS1 and the communication frequency of the second protocol signal PS2, the communication frequency of the first protocol signal PS1 is called a first communication frequency, and the communication frequency of the second protocol signal PS2 is called a second communication frequency.

In the high-speed data communication such as the auto training mode or the display mode, a large difference in data loss rate may occur depending on the configuration of a receiving circuit. Alternatively, in the high-speed data communication, communication may not be performed smoothly depending on the configuration of the receiving circuit. Therefore, the display device according to an embodiment may transmit configuration data for smoothly performing high-speed data communication from a transmitting side to a receiving side before performing high-speed data communication. Such configuration data may be transmitted/received through low-speed data communication such as the command mode. In the low-speed data communication, since there is no significant difference in the data loss rate depending on the configuration of the receiving circuit, a configuration value can be transmitted to the receiving circuit relatively accurately.

Before transmitting the first protocol signal PS1 corresponding to high-speed data communication, the data processing device may transmit configuration data required for high-speed data communication by transmitting the second protocol signal PS2 corresponding to low-speed data communication.

Meanwhile, when the display device is in the command mode, a preamble section, a CFG data section, and a CFG done section included in the second protocol signal PS2 can be used.

In the preamble section, the second protocol signal PS2 may include a low-speed data communication clock. The data driving device may train a corresponding clock using the low-speed data communication clock and may receive low-speed data using the trained clock.

In the CFG data section, the second protocol signal PS2 may include low-speed data. The data driving device may receive low-speed data using the aforementioned clock (low-speed data communication clock). The low-speed data may include configuration data of the data driving device performing high-speed data communication, that is, a gain configuration value of an equalizer, scramble information, line polarity information, and the like. The data driving device may configure the communication circuit to operate for high-speed data communication by using the configuration data.

Here, the scramble information may include information on whether data is transmitted as it is or scrambled and transmitted when the data processing device transmits the data to the data driving device, and the line polarity information may include information indicating the polarity of a first line of a pixel.

In the CFG done section, the second protocol signal PS2 may include a message indicating termination of communication. The data driving device may confirm this message and may terminate communication according to the second protocol signal PS2.

An auxiliary communication signal ALP may be maintained at a low level after operation and may be changed to a high level when training on the low-speed data communication clock is completed. After the driving voltage VCC is supplied, the data driving device may maintain the auxiliary communication signal ALP at a low level, and may change the auxiliary communication signal ALP to a high level when training on the low-speed data communication clock is completed in the preamble section.

The data processing device may transmit low-speed data through the second protocol signal PS2 after the auxiliary communication signal ALP is changed to the high level. Here, the auxiliary communication signal ALP may be referred to as a LOCK signal, and the data driving device may transmit low-speed data to the data processing device through a second communication line (LN2 in FIG. 2).

When an error occurs in the internal state or an unscheduled communication error occurs after the data driving device changes the auxiliary communication signal ALP to high level, for example, unlocking in a clock restoring circuit, it is possible to change the auxiliary communication signal ALP to a low level. For example, when low-speed data cannot be received or the clock is broken in the CFG data section or the CFG done section, the data driving device may change the auxiliary communication signal ALP to a low level.

Meanwhile, if the display device is in the auto training mode, a pre-clock training section included in the second protocol signal PS2 can be used.

The second communication frequency, e.g., a frequency for low-speed data communication may be determined in advance. In other words, the second communication frequency may be a commonly used frequency irrespective of the specifications of the display device, and the data driving device may perform low-speed data communication with the data processing device after configuring the communication circuit to a predetermined second communication frequency.

On the other hand, the first communication frequency, e.g., a frequency for high-speed data communication may not be determined in advance. When the data processing device transmits a signal having one frequency, the data driving device may need to configure the communication circuit to be suitable to the one frequency. Therefore, the data processing device and the data driving device may further include the pre-clock training section in the first protocol signal PS1 to configure the communication circuit to be suitable to the first communication frequency.

Specifically, the data processing device may transmit the first protocol signal PS1 including a training clock pattern TR_CLK to the data driving device in the pre-clock training section.

The data driving device may train on the training clock pattern TR_CLK included in the first protocol signal PS1 while changing the configuration value of the clock restoring circuit. In addition, the data driving device may select an optimal configuration value of the clock restoring circuit according to the training result for the training clock pattern TR_CLK, and may configure the clock restoring circuit using the optimal configuration value.

Meanwhile, when the display device is in the auto training mode, an EQ training section included in the second protocol signal PS2 can be used.

The signal transmitted by the data processing device may be distorted in a process of reaching the data processing device. The data driving device may comprise an equalizer to compensate for distortion and may set characteristics of the equalizer. Specifically, the data driving device may perform a clock training and determine whether there is an abnormality in data restored using a generated clock so as to set the characteristics of the equalizer.

Meanwhile, when the display device is in the display mode, a clock training section, a link training section, a VB section, and a frame section included in the second protocol signal PS2 can be used. Specifically, the data driving device may restore the clock by performing clock training on the clock training section. The data driving device may determine whether data is processed by meaning or by link by performing link training on the link training section. The data driving device may output image data included in the frame section and may wait for the output of the image data in the VB section.

Figure 5:
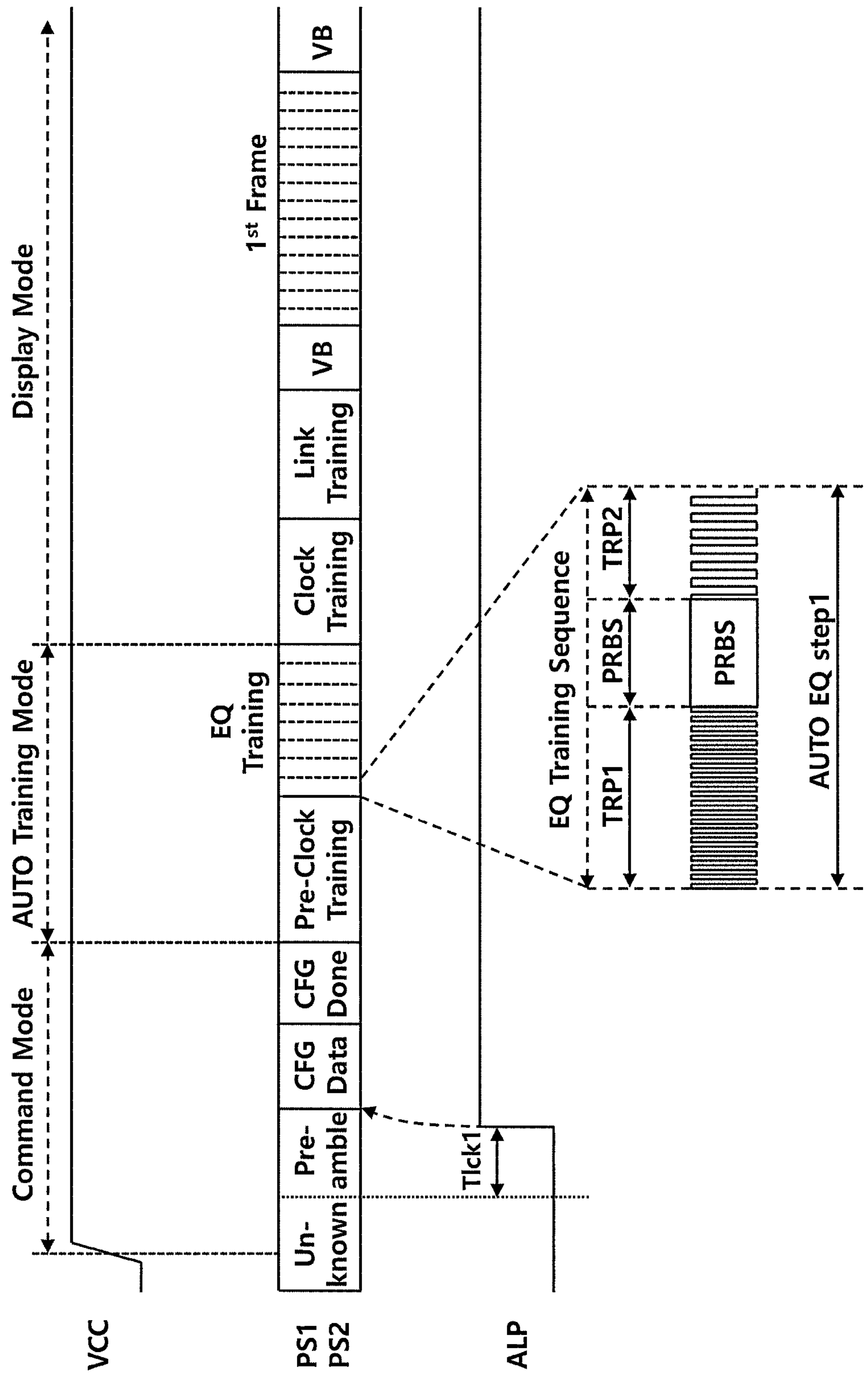
FIG. 5 is an exemplary diagram illustrating a signal sequence between a data processing device and a data driving device for explaining EQ training according to an embodiment.

FIG. 5 is an exemplary diagram illustrating a signal sequence between a data processing device and a data driving device for explaining EQ training according to an embodiment.

Referring to FIG. 5, a signal sequence including an EQ training section for configuring an equalizer is shown.

A data processing device may store a plurality of pieces of equalizer (EQ) configuration information and may transmit the plurality of pieces of EQ configuration information to a data driving device. The plurality of pieces of EQ configuration information may be transmitted to the data driving device through low-speed data communication. The data driving device may determine an optimal EQ configuration value from the plurality of pieces of EQ configuration information through a plurality of experiments on signal distortion of a first communication line (LN1 in FIG. 3) that is changed frequently.

The data processing device may generate a second protocol signal PS2 including a plurality of pieces of EQ configuration information. The data processing device may include the plurality of pieces of EQ configuration information in the CFG data section of the second protocol signal PS2.

The plurality of pieces of EQ configuration information may include gain levels of different equalizers, respectively. For example, when the plurality of pieces of EQ configuration information is first EQ configuration information and second EQ configuration information, the first EQ configuration information may include a first gain level, and the second EQ configuration information may include a second gain level different from the first gain level. Each of the plurality of pieces of EQ configuration information may further include a tap coefficient of an equalizer.

The data driving device may receive the second protocol signal PS2 including the plurality of pieces of EQ configuration information. The data driving device may store the plurality of pieces of EQ configuration information in an auxiliary storage medium, for example, a register or the like.

Here, the second protocol signal PS2 may further include information on the number of the plurality of pieces of EQ configuration information in addition to the plurality of pieces of EQ configuration information. For example, when the plurality of pieces of EQ configuration information is 8 pieces of EQ configuration information, the number information may be "8". In addition, the second protocol signal PS2 may further include EQ basic configuration information, scramble information, line polarity information, and the like. The EQ basic configuration information may include a basic gain level of an equalizer for high-speed data communication, and the scramble information may include information on whether data is transmitted as it is or scrambled and transmitted when the data processing device transmits the data to the data driving device. Also, the line polarity information may include information indicating the polarity of a first line of a pixel.

When the low-speed data communication is terminated as described above, the data processing device may include a signal for EQ training in the first protocol signal PS1 and may transmit the signal to the data driving device through the first communication line. Here, the data processing device may transmit the signal for EQ training for a plurality of time sections. In FIG. 5, a plurality of time sections may be represented by dotted lines of the EQ training section.

The data driving device may receive the signal for EQ training during the plurality of time sections, and may configure the equalizer according to the plurality of pieces of EQ configuration information during the plurality of time sections. Here, the data driving device may evaluate the reception performance of the data driving device for the signal for EQ training in each time section by changing the configuration of the equalizer in each time section. Through this, the data driving device can select optimal configuration information from among the plurality of pieces of EQ configuration information according to the evaluation result for each time section.

Specifically, the signal for EQ training may include a sequence that is repeated for each time section as shown in FIG. 5. The sequence may include a first pattern signal TRP1, a second pattern signal TRP2, and a PRBS.

The data driving device may perform clock training on the first pattern signal TRP1. The data driving device may restore data using a clock restored by clock training. In addition, the data driving device may confirm whether the PRBS included in the restored data matches a pre-stored bit string, and may confirm a bit error rate (BER) for the PRBS.

When the signal for EQ training is encoded with a DC balance code, the data driving device may confirm the number of "0s" and "1s" in the restored data, and through this, may confirm whether there is a data error for an EQ test signal (EQTP). Here, a DC balance code method may include an 8B10B encoding/decoding method.

Figure 6:
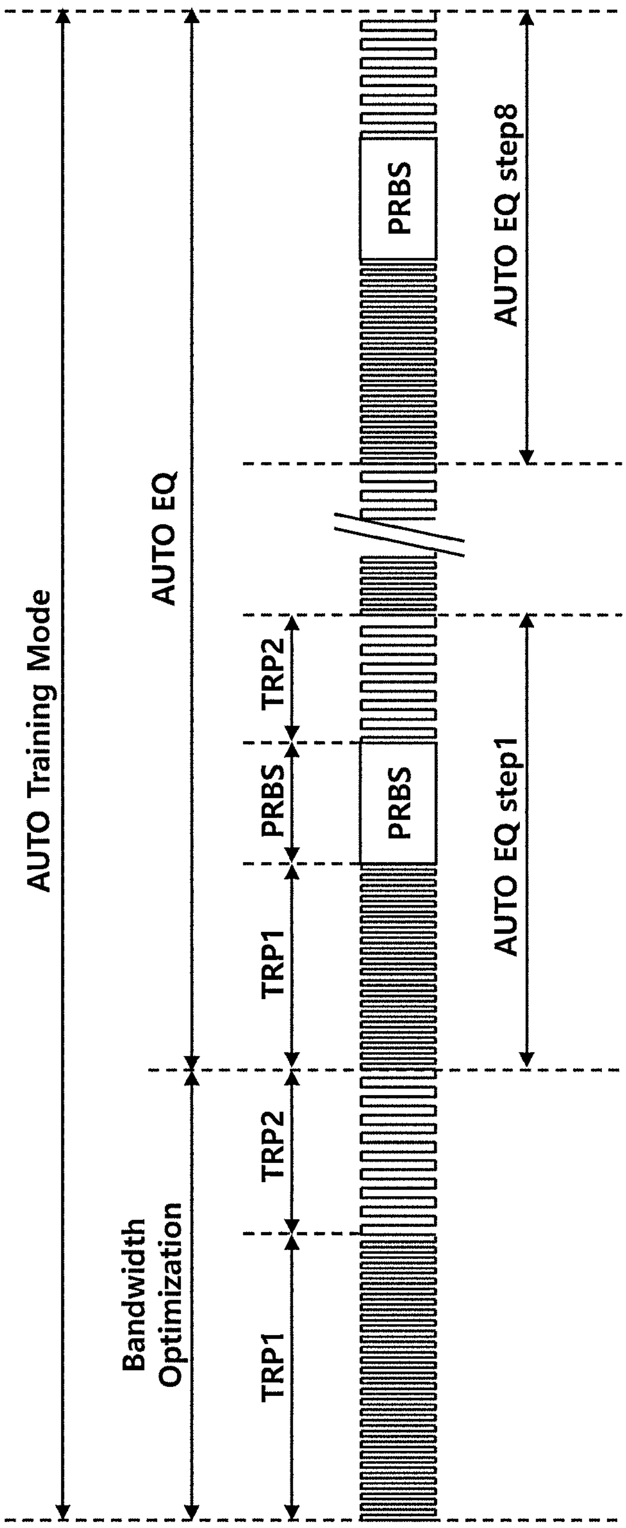
FIG. 6 is an exemplary diagram illustrating a signal sequence between a data processing device and a data driving device in an auto training mode according to an embodiment.

FIG. 6 is an exemplary diagram illustrating a signal sequence between a data processing device and a data driving device in an auto training mode according to an embodiment.

Referring to FIG. 6, in the auto training mode, a signal sequence between the data processing device and the data driving device may include a first pattern signal TRP1 and a second pattern signal TRP2 following the first pattern signal TRP1. Alternatively, the signal sequence between the data processing device and the data driving device may further include a PRBS between the first pattern signal TRP1 and the second pattern signal TRP2.

When the display device operates in the auto training mode to prepare for transmission and reception of image data, the display device may perform a bandwidth optimization step and an auto EQ step.

When the display device performs the bandwidth optimization step, the data driving device may configure the communication circuit of the data driving device to be suitable to a frequency, e.g., a first communication frequency, that enables high-speed data communication with the data processing device. The data processing device may transmit the first pattern signal TRP1 to the data driving device. Next, the data driving device may restore the clock by performing clock training on the first pattern signal TRP1 through the clock restoring circuit.

Subsequently, the data processing device may transmit the second pattern signal TRP2 to the data driving device. When receiving the second pattern signal TRP2, the data driving device may end the bandwidth optimization step and may enter the auto EQ step. Accordingly, the second pattern signal TRP2 of the bandwidth optimization step may include end information of the bandwidth optimization step.

Therefore, the first pattern signal TRP1 of the bandwidth optimization step may correspond to the pre-clock training section of FIG. 4. The second pattern signal TRP2 may be further included in the pre-clock training section.

When the display device performs the auto EQ step, the data driving device may configure an equalizer for evaluating the reception performance of the signal transmitted by the data processing device and improving the quality of the signal. The data processing device may transmit the first pattern signal TRP1 to the data driving device. Next, the data driving device may restore the clock by performing clock training on the first pattern signal TRP1 through the clock restoring circuit. The data driving device may restore a PRBS using the restored clock and may calculate a bit error rate for the restored PRBS. The data driving device may evaluate the reception performance of the signal transmitted by the data processing device according to the bit error rate.

Subsequently, the data processing device may transmit the second pattern signal TRP2 to the data driving device. When receiving the second pattern signal TRP2, the data driving device may end the auto EQ step and may enter the display mode. Accordingly, the second pattern signal TRP2 of the auto EQ step may include end information of the AUTO EQ step.

Therefore, the first pattern signal TRP1, the PRBS, and the second pattern signal TRP2 of the auto EQ step may correspond to the EQ training section of FIG. 5.

Meanwhile, the auto EQ step may include a plurality of auto EQ steps. The data driving device may configure the equalizer for each step.

For example, the data driving device may configure the equalizer in eight auto EQ steps (auto EQ steps 1 to 8). In eight auto EQ steps (auto EQ steps 1 to 8), the data processing device may transmit a data packet including the first pattern signal TRP1, the PRBS, and the second pattern signal TRP2. In each step, when receiving the first pattern signal TRP1, the data driving device may configure the equalizer and may end the configuration of the equalizer.

Here, when receiving the second pattern signal TRP2, the data driving device may end the first auto EQ step (auto EQ step 1) and may enter the second auto EQ step. Alternatively, the data driving device may enter the display mode when the configuration of the equalizer is terminated in the eighth auto EQ step (auto EQ step 8). The data driving device may find an optimal equalizer configuration state by repeating the above-described equalizer configuration eight times.

Figure 7:
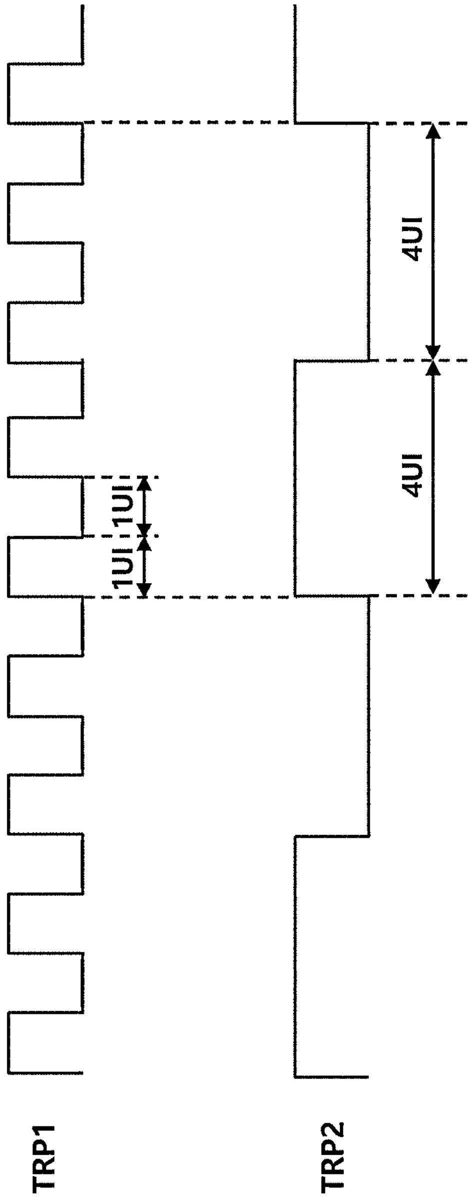
FIG. 7 is an exemplary diagram illustrating a signal including a first pattern signal and a second pattern signal according to an embodiment.

FIG. 7 is an exemplary diagram illustrating a signal including a first pattern signal and a second pattern signal according to an embodiment.

Referring to FIG. 7, examples of a signal including the first pattern signal TRP1 and a signal including the second pattern signal TRP2 are illustrated. According to an embodiment, the first pattern signal TRP1 and the second pattern signal TRP2 may be included in a first protocol signal for high-speed data communication between the data processing device and the data driving device.

As described above, the first pattern signal TRP1 may be used for clock training in the bandwidth optimization step or the auto EQ step. Accordingly, the data driving device may generate an optimal configuration value for the clock restoration circuit through the first pattern signal TRP1. The second pattern signal TRP2 may be used to inform the end of each step.

The second pattern signal TRP2 may have a frequency about 4 times slower than that of the first pattern signal TRP1. For example, when the first pattern signal TRP1 is 4 Gbps, the second pattern signal TRP2 may have a frequency of 1 Gbps. Accordingly, when the first pattern signal TRP1 has two-unit intervals (UIs) for one period, the second pattern signal TRP2 may include eight UIs for one period.

Here, the second pattern signal TRP2 may be transmitted at a frequency that is about 4 times slower, and may vary depending on a transmission environment or configuration, although not necessarily a 4 times difference. There must be a difference enough to allow the data driving device to clearly recognize the second pattern signal TRP2.

Also, the first pattern signal TRP1 and the second pattern signal TRP2 may have a pattern in which DC balance is maintained. Accordingly, the first pattern signal TRP1 and the second pattern signal TRP2 may be encoded as a DC balancing code, for example, an 8B10B code in the data processing device, and may have the form of "10101010 . . . ". Therefore, even if the first pattern signal TRP1 and the second pattern signal TRP2 pass through the coupling capacitors 301 to 304 of FIG. 3 between the data processing device and the data driving device, distortion may not occur.

Figure 8:
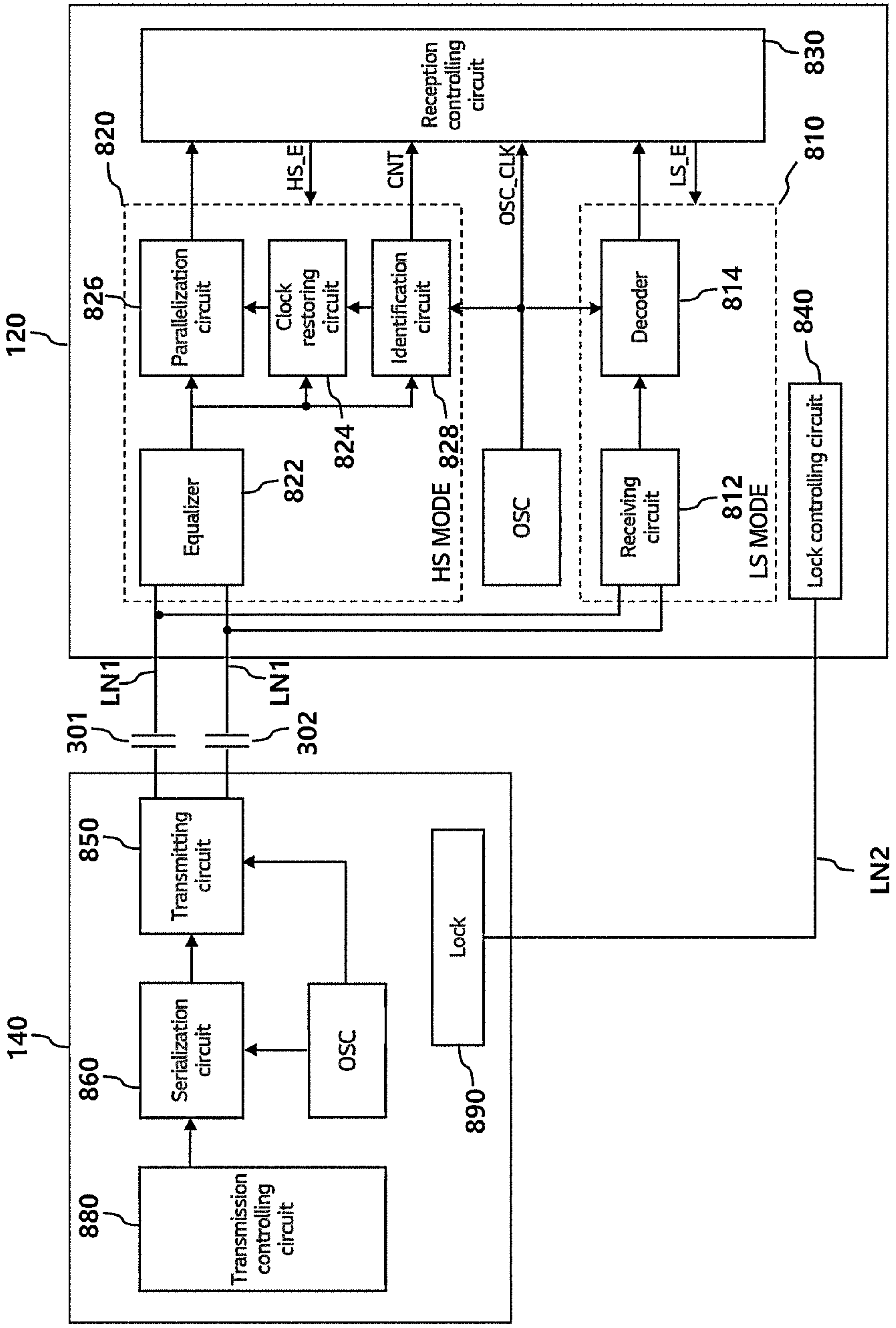
FIG. 8 is a block diagram illustrating a data processing device and a data driving device according to an embodiment.

FIG. 8 is a block diagram illustrating a data processing device and a data driving device according to an embodiment.

Referring to FIG. 8, the data driving device 120 may include a low-speed communication module 810 involved in low-speed data communication and a high-speed communication module 820 involved in high-speed data communication.

The low-speed communication module 810 may be activated in a command mode, and may be deactivated in an auto training mode and a display mode. The low-speed communication module 810 may receive and process a second protocol signal from the data processing device 140 through the first communication line LN1. The low-speed communication module 810 may include a receiving circuit 812 and a decoder 814 (LS MODE).

The receiving circuit 812 may be connected to the first communication line LN1 including one or more coupling capacitors 301 and 302. The receiving circuit 812 may receive a second protocol signal encoded with a DC balance code through the first communication line LN1. Here, a Manchester code may be used as the DC balancing code.

In addition, the receiving circuit 812 may include a buffer that temporarily stores a received signal to serve as a buffer for the signal reception. The receiving circuit 812 may transmit the signal temporarily stored in the buffer to the decoder 814.

The decoder 814 may receive the second protocol signal, for example, a preamble section and may restore a clock for low-speed data communication through clock training. Here, the decoder 814 may receive a basic clock OSC_CLK generated by an oscillator OSC, and may synchronize the basic clock OSC_CLK with the second protocol signal, for example, the preamble section through clock training.

In addition, the decoder 814 may receive data for configuring the data driving device 120 from the receiving circuit 812 and may decode the received data into a DC balancing code. The decoder 814 may transmit the decoded data to a reception controlling circuit 830. Here, the Manchester code may be used as the DC balancing code.

On the other hand, the high-speed communication module 820 may be activated in an auto training mode and the display mode, and may be deactivated in the command mode. The high-speed communication module 820 may receive and process the first protocol signal from the data processing device 140 through the first communication line LN1. The high-speed communication module 820 may include an equalizer 822, a clock restoring circuit 824, a parallelization circuit 826, and an identification circuit 828 (HS MODE).

The equalizer 822 may adjust a signal received from the data processing device 140 through the first communication line LN1. In addition, the equalizer 822 may transmit a signal passing through the first communication line LN1 to the clock restoring circuit 824 or the identification circuit 828.

For example, the equalizer 822 may adjust a first protocol signal PS1 received through the first communication line LN1. The first protocol signal PS1 may include image data and may be based on high-speed data communication.

Specifically, distortion may occur in the signal passing through the first communication line LN1, and high-frequency component attenuation (or pulse dispersion) and inter-symbol interference (ISI) may occur in the signal passing through the first communication line LN1. The equalizer 822 may reproduce (or remove pulse dispersion of) a high frequency component, thereby reducing inter-symbol interference.

The clock restoring circuit 824 may perform clock training on a signal including a training pattern, for example, a training clock pattern TR_CLK of FIG. 4. The clock restoring circuit 824 may restore the clock through clock training. The clock restoring circuit 824 may restore data using the restored clock, and when the restored data matches reference data, the restored clock may be used for communication with the data processing device 140.

Here, the clock restoring circuit 824 may generate different clocks according to a configuration value. Hereinafter, the configuration value necessary for the clock restoring circuit 824 to generate a clock may be referred to as a CDR configuration value. When the clock restoring circuit 824 receives an optimal CDR configuration value, clock training on the training pattern may be completed and the clock based on the training pattern may be restored.

The parallelization circuit 826 may convert serial data into parallel data. The parallel data may be data included in the first protocol signal or data included in the second protocol signal. The parallelization circuit 826 may receive the clock restored from the clock restoring circuit 824 and may parallelize the data received from the data processing device 140 through the restored clock.

The identification circuit 828 may distinguish the first pattern signal TRP1 of FIG. 6 and the second pattern signal TRP2 of FIG. 6 from the signal received from the data processing device 140. The identification circuit 828 may generate an identification value, for example, a count value CNT as a result. A reception controlling circuit 830 may determine which of the first pattern signal and the second pattern signal is received through the identification value.

Meanwhile, the data driving device 120 may further include the reception controlling circuit 830, a lock controlling circuit 840, and an oscillator OSC.

The reception controlling circuit 830 may receive the identification value from the identification circuit 828, may perform configuration for receiving image data with respect to a communication circuit when the first pattern signal is received, and may control the communication circuit to terminate the configuration when the second pattern signal is received. For example, when the identification value indicates the first pattern signal, the reception controlling circuit 830 may determine that the first pattern signal is received by the data driving device 120. Next, the reception controlling circuit 830 may configure the communication circuit of the data driving device 120 to operate in the auto training mode. The reception controlling circuit 830 may configure a communication frequency for receiving image data in a bandwidth optimization step, and may configure the equalizer 822 in an auto EQ step.

In order to distinguish the first pattern signal TRP1 in FIG. 6 and the second pattern signal TRP2 in FIG. 6, the identification circuit 828 may include a divider (not shown) and a counter (not shown) therein. The identification circuit 828 may divide a signal including the first pattern signal TRP1 in FIG. 6 and the second pattern signal TRP2 in FIG. 6 to generate a divided clock, and may count the divided clock to generate a count value CNT. The reception controlling circuit 830 may receive the count value CNT, and may determine which of the first pattern signal TRP1 in FIG. 6 and the second pattern signal TRP2 in FIG. 6 has been received by the data driving device 120 according to the count value CNT.

The oscillator OSC is a kind of oscillator that generates an arbitrary clock, and may generate a counting clock that counts the clock. In addition, the oscillator OSC may generate a basic clock OSC_CLK used to restore a clock for low-speed data communication in the decoder 814. Also, the oscillator OSC may generate the basic clock OSC_CLK used in the communication circuit of the data driving device 120.

The lock controlling circuit 840 may generate a low-level lock signal before completing the clock training in the decoder 814 or the clock restoring circuit 824, and may transmit the generated lock signal to a lock monitoring circuit 89 of the data processing device 140 through the second communication line LN2.

In addition, after the decoder 814 or the clock restoring circuit 824 completes clock training, the lock controlling circuit 840 may generate a high-level lock signal and may transmit the generated lock signal to the lock monitoring circuit 890.

In addition, when the lock controlling circuit 840 is abnormal in the internal state or an unscheduled communication error occurs after the clock training is completed, for example, unlocking of the decoder 814 or the clock restoring circuit 824, the lock controlling circuit 840 may change the lock signal to a low level (L). For example, when data cannot be received or the clock is broken, the lock controlling circuit 840 may change the lock signal to a low level.

When unlocking occurs after clock training is completed in high-speed data communication, the reception controlling circuit 830 may configure the communication circuit to perform low-speed data communication. For example, if unlocking occurs while the display device is operating in the auto training mode based on high-speed data communication, the reception controlling circuit 830 may configure the communication circuit so that the display device operates in the command mode.

Meanwhile, the data processing device 140 may include a transmitting circuit 850, a serialization circuit 860, a transmission controlling circuit 880, and a lock monitoring circuit 890.

The transmitting circuit 850 may be connected to the first communication line LN1 including one or more coupling capacitors 301 and 302. The transmitting circuit 850 may receive a first protocol signal or a second protocol signal in serial form from the serialization circuit 860. The second protocol signal may include the first pattern signal TRP1 in FIG. 6 and the second pattern signal TRP2 in FIG. 6. Alternatively, the second protocol signal may further include a PRBS.

The serialization circuit 860 may convert parallel data into serial data. The serial data may be data included in the first protocol signal or data included in the second protocol signal.

The transmission controlling circuit 880 may generate a second protocol signal based on low-speed data communication from the outside. Here, the second protocol signal may include a preamble section, a CFG data section, and a CFG done section, and may be encoded with Manchester code to have DC balancing. The transmission controlling circuit 880 may generate the second protocol signal in a parallel form and may transmit the generated protocol signal to the serialization circuit 860.

Also, the transmission controlling circuit 880 may generate a first protocol signal based on high-speed data communication from the outside. Here, the first protocol signal may include a pre-clock training section and a EQ training section, and may be encoded with an 8B10B code to have DC balancing. The transmission controlling circuit 880 may generate a first protocol signal in a parallel form and transmit the generated first protocol signal to the serialization circuit 860. Also, the first protocol signal may include image data.

The lock monitoring circuit 890 may receive a lock signal from the lock controlling circuit 840 of the data driving device 120. When the lock signal received by the lock monitoring circuit 890 in low-speed data communication is changed from a low level to a high level, the transmission controlling circuit 880 may generate a second protocol signal for high-speed data communication.

Next, when the lock signal received by the lock monitoring circuit 890 in high-speed data communication is changed from a low level to a high level, the transmission controlling circuit 880 may generate a second protocol signal including image data.

The oscillator OSC of the data processing device 140 is a kind of oscillator that generates an arbitrary clock, and may generate an internal clock used in the communication circuit of the data processing device 140. For example, the internal clock may be transmitted to the serialization circuit 860 and may be used to convert parallel data into serial data.

Figure 9:
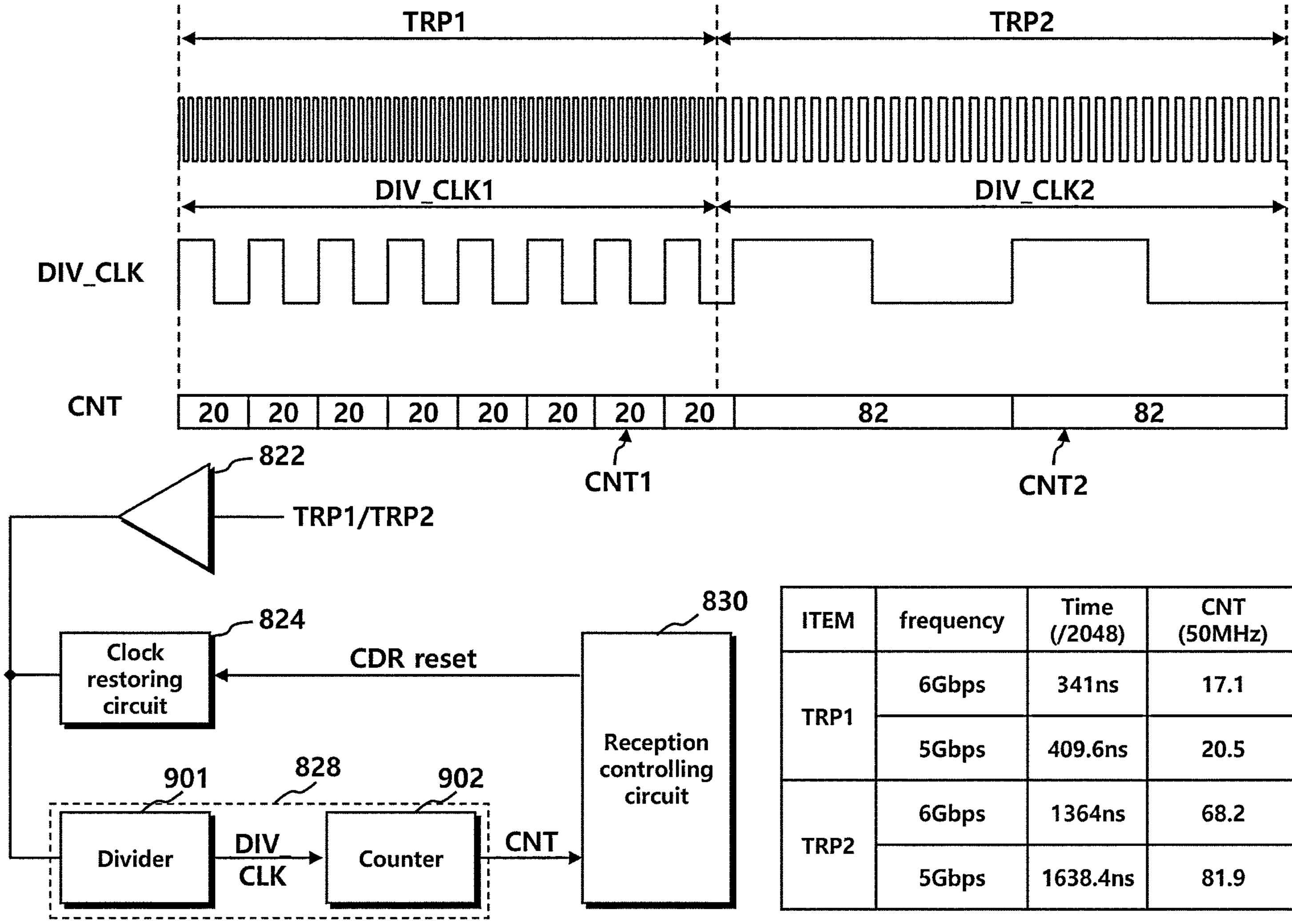
FIG. 9 is a diagram illustrating identification of a first pattern signal and a second pattern signal through a counter according to an embodiment.

FIG. 9 is a diagram illustrating identification of a first pattern signal and a second pattern signal through a counter according to an embodiment.

Referring to FIG. 9, the identification circuit 828 may identify the first pattern signal TRP1 and the second pattern signal TRP2 through a divider 901 and a counter 902. Here, the first pattern signal TRP1 may have a first frequency, and the second pattern signal TRP2 may have a second frequency lower than the first frequency.

The first pattern signal TRP1 and the second pattern signal TRP2 may be transmitted to the clock restoring circuit 824 and the identification circuit 828 via the equalizer 822. In the clock restoring circuit 824, clock training for the first pattern signal TRP1 may be performed, and an identification value for the first pattern signal TRP1 and the second pattern signal TRP2 may be generated in the identification circuit 828.

The identification circuit 828 may receive the first pattern signal TRP1 and the second pattern signal TRP2 to generate a division clock DIV_CLK. The divider 901 may divide a first frequency of the first pattern signal TRP1 to generate a first division clock DIV_CLK1 and may divide a second frequency of the second pattern signal TRP2 to generate a second division clock DIV_CLK2.

The frequency of the first division clock DIV_CLK1 may be lower than the first frequency, and the frequency of the second division clock DIV_ClK2 may be lower than the second frequency. According to the first pattern signal TRP1 and the second pattern signal TRP2, the frequency of the second division clock DIV_CLK2 may be lower than the frequency of the first division clock DIV_CLK1.

Subsequently, the counter 902 may generate a count value CNT by counting the divided clock DIV_CLK as a counting clock. The counter 902 may count the first division clock DIV_CLK1 as the counting clock to generate a first count value CNT1, and may count the second division clock DIV_CLK2 as the counting clock to generate a second count value CNT2.

Here, since the frequency of the second division clock DIV_CLK2 is lower than the frequency of the first division clock DIV_CLK1, the first count value CNT1-20- can be lower than the second count value CNT2-82-.

In fact, when the first pattern signal TRP1 having a first frequency of 6 Gbps is divided by a division ratio of 2048, a count value of 17.1 may be calculated. When the first pattern signal TRP1 having a first frequency of 5 Gbps is divided by a division ratio of 2048, a count value of 20.5 may be calculated. Similarly, when the second pattern signal TRP2 having a second frequency of 6 Gbps is divided by a division ratio of 2048, a count value of 68.2 may be calculated. When the second pattern signal TRP2 having a second frequency of 5 Gbps is divided by a division ratio of 2048, a count value of 81.9 may be calculated. Here, the basic clock OSC_CLK in FIG. 8 generated by the oscillator of the data driving device may be used as the counting clock, and the frequency of the counting clock may be 50 MHz.

The reception controlling circuit 830 may receive an identification value such as a count value, and may recognize the first pattern signal TRP1 or the second pattern signal TRP2 according to the identification value. For example, the reception controlling circuit 830 may receive a first count value CNT1 for the first pattern signal TRP1 and a second count value CNT2 for the second pattern signal TRP2. The reception controlling circuit 830 may determine that the first pattern signal TRP1 is received by the data driving device while having a relatively smaller first count value CNT1 of the two count values. The reception controlling circuit 830 may determine that the second pattern signal TRP2 is received by the data driving device while having a relatively larger second count value CNT2 of the two count values.

Also, the reception controlling circuit 830 may determine a one count value belonging to a predetermined range as an identification value. For example, the reception controlling circuit 830 may receive the identification value including the one count value generated from the counter, and when the one count value falls within a predetermined range composed of a plurality of values, the one count value may be determined to be the first count value CNT1 for the first pattern signal TRP1 or the second count value CNT2 for the second pattern signal TRP2. Here, the predetermined range may be a range predicted from the frequency of the first pattern signal TRP1 or the second pattern signal TRP2.

In addition, the reception controlling circuit 830 may determine a count value that is identically generated several times in succession as the identification value. For example, in FIG. 9, since the first count value CNT1 corresponding to "20" is identically generated several times in succession with respect to the first pattern signal TRP1, the reception controlling circuit 830 may finally determine the first count value CNT1 as "20". In addition, since the second count value CNT2 corresponding to "82" is identically generated several times in succession with respect to the second pattern signal TRP2, the reception controlling circuit 830 may finally determine the second count value CNT2 as "82".

Figure 10:
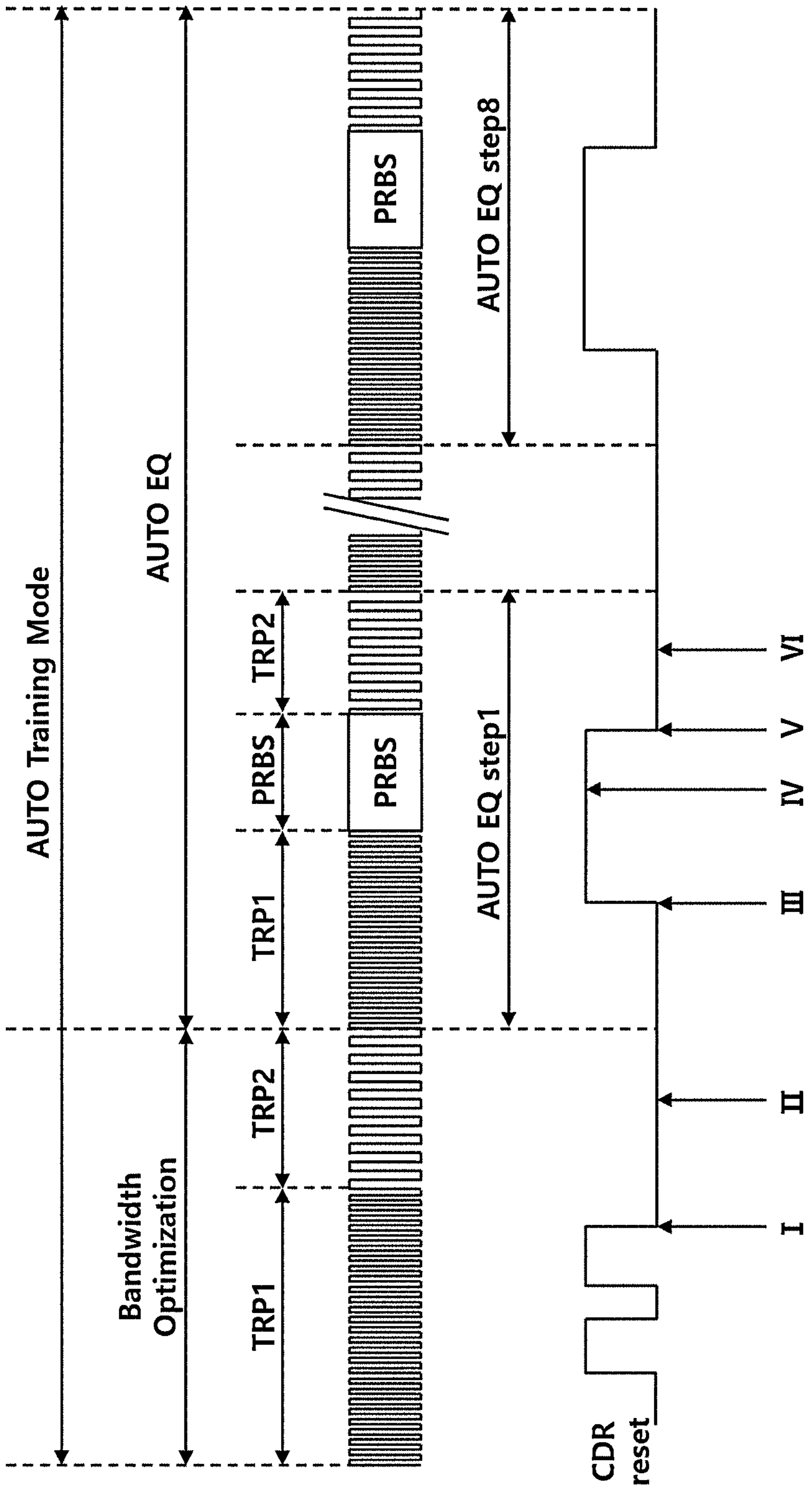
FIG. 10 is a diagram illustrating the operation of a clock restoring circuit according to a signal sequence between a data processing device and a data driving device according to an embodiment.

FIG. 10 is a diagram illustrating the operation of a clock restoring circuit according to a signal sequence between a data processing device and a data driving device according to an embodiment.

Referring to FIG. 10, in a bandwidth optimization step, the data driving device may start to recognize the first pattern signal TRP1.

At the time of I, the data driving device may find a CDR configuration value for the clock restoring circuit and may then generate and store a first count value CNT1. The data driving circuit may stop the driving of the clock restoring circuit by configuring a reset signal CDR reset for driving the clock restoring circuit to a low level.

At the time of II, the data driving device may recognize the second pattern signal TRP2 by generating a second count value CNT2 to compare the generated second count value with the first count value CNT1. The data driving device may terminate the bandwidth optimization step. At the same time, the data driving device may apply an optimal CDR configuration value for the clock restoring circuit.

Next, in the auto EQ step, the data driving device may start to recognize the first pattern signal TRP1.

At the time of III, the data driving device may start driving of the clock restoring circuit by configuring a reset signal CDR reset for driving the clock restoring circuit to a high level.

At the time of IV, the data driving device may evaluate the reception performance of the equalizer and may find an EQ configuration value for the equalizer. Here, the data driving device may restore the PRBS and may inspect a bit error rate for the restored PRBS.

At the time V, the data driving device may terminate the inspection of the bit error rate. In addition, the data driving device may stop the driving of the clock restoring circuit by configuring the reset signal CDR reset for driving the clock restoring circuit to a low level.

At the time VI, the data driving device may generate a second count value CNT2 and may compare the generated second count value with the first count value CNT1 to recognize the second pattern signal TRP2. The data driving device may terminate the auto EQ step or one time section (one of auto EQ steps 1 to 8) during the auto EQ step. At the same time, the data driving device may apply an optimal EQ configuration for the equalizer.

When the auto EQ step includes a plurality of time sections, the data driving device may be aware of the number of times the equalizer is configured through the number of the second pattern signals TRP2 recognized in the auto EQ step. The data driving device may receive in advance information on the number of times the equalizer is configured or information on the number of the second pattern signals TRP2 in the auto EQ step through low-speed data communication. The data driving device may repeat the configuration of the equalizer the same number of times as this number of times and may operate in the display mode.

Figure 11:
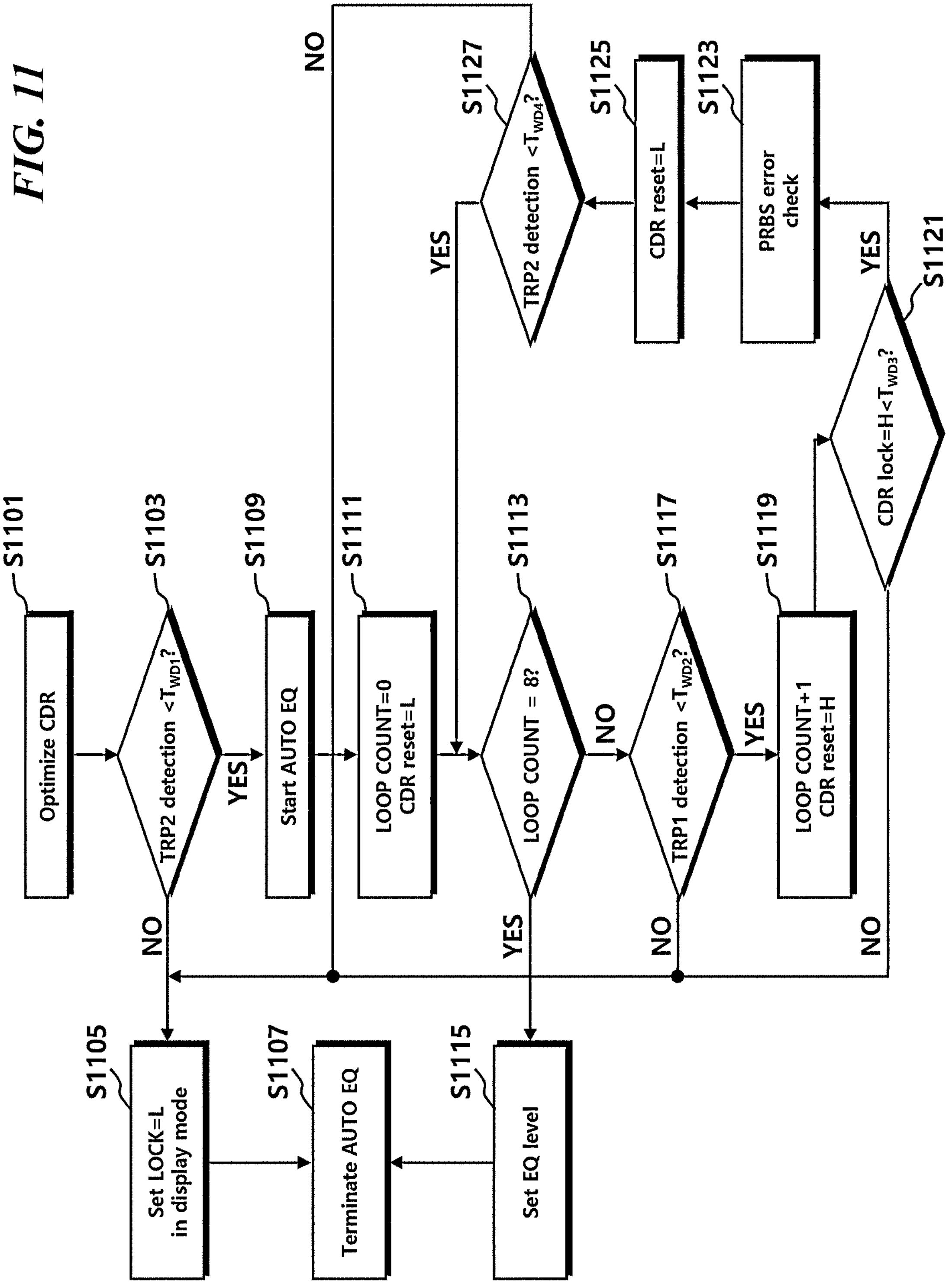
FIG. 11 is a flowchart illustrating the operation of a data driving device according to a signal sequence between a data processing device and the data driving device according to an embodiment.

FIG. 11 is a flowchart illustrating the operation of a data driving device according to a signal sequence between a data processing device and the data driving device according to an embodiment.

Referring to FIG. 11, in a bandwidth optimization step, the data driving device may configure the clock restoring circuit using an optimal CDR configuration value in step S1101.

The data driving device may detect a second pattern signal TRP2 within a first detection period $T_{WD1}$ in step S1103.

When the second pattern signal TRP2 is not detected, the data driving device may enter the display mode for receiving image data, and may transmit a lock signal indicating unlocking to the data processing device (LOCK=L). Alternatively, the data driving device may directly transmit a lock signal indicating unlocking to the data processing device without entering the display mode (NO in step S1103 and in step S1105). Next, the data driving device may terminate or skip the auto EQ step in step 1107.

When the second pattern signal TRP2 is detected, the data driving device may start the auto EQ step in YES of step S1103 and step S1109.

In the auto EQ step, the data driving device may stop the driving of the clock restoring circuit by configuring a reset signal CDR reset for driving the clock restoring circuit to a low level. When the auto EQ step includes a plurality of time sections, the data driving device may start configuration of a first equalizer in step S1111.

The data driving device may determine whether the equalizer is configured for all time sections in step S1113.

When the data driving device has configured the equalizer for all time sections, the equalizer may be configured to an optimal EQ configuration value in YES in step S1113 and in step S1115).

When the data driving device does not configure the equalizer for all time sections, the first pattern signal TRP1 may be detected within a second detection period $T_{WD2}$ in NO in step S1113 and in step S1117.

When the first pattern signal TRP1 is not detected, the data driving device may enter a display mode for receiving image data, and may transmit a lock signal indicating unlocking to the data processing device (LOCK=L). Alternatively, the data driving device may directly transmit the lock signal indicating unlocking to the data processing device without entering the display mode in NO in step S1117 and in step S1105. In addition, the data driving device may terminate or skip the auto EQ step in step S1107.

As another additional method, when the first pattern signal TRP1 is not detected, the data driving device may terminate the configuration of the equalizer in the corresponding time section and may start the detection of the second pattern signal TRP2.

When the first pattern signal TRP1 is detected, the data driving device may start to drive the clock restoring circuit by configuring a reset signal CDR reset for driving the clock restoring circuit to a high level in step S1119.

Next, the data driving device may detect whether the clock training is completed within a third detection period $T_{WD3}$ in step S1121.

When the clock training is not completed, the data driving device may enter the display mode for receiving image data, and may transmit a lock signal indicating unlocking to the data processing device (LOCK=L). Alternatively, the data driving device may directly transmit the lock signal indicating unlocking to the data processing device without entering the display mode in NO in step S1121 and in step S1105. In addition, the data driving device may terminate or skip the auto EQ step in step S1107.

As another additional method, when the clock training is not completed, the data driving device may start to detect the second pattern signal TRP2, and when the second pattern signal TRP2 is detected, the data driving device may terminate the configuration of the equalizer in a corresponding time section and may start to configure the equalizer in another time section.

When the clock training is completed, the data driving device may inspect a bit error rate with respect to a PRBS in step S1123.

After the bit error rate is inspected, the data driving device may stop the driving of the clock restoring circuit by configuring the reset signal CDR reset for driving the clock restoring circuit to a low level in step S1125.

The data driving device may detect the second pattern signal TRP2 within a fourth detection period $T_{WD4}$ in step S1127.

When the second pattern signal TRP2 is not detected, the data driving device may enter the display mode for receiving image data and may transmit a lock signal indicating unlocking to the data processing device (LOCK=L). Alternatively, the data driving device may directly transmit the lock signal indicating unlocking to the data processing device without entering the display mode in NO in step S1127 and in step S1105. In addition, the data driving device may terminate or skip the auto EQ step in step S1107.

When the second pattern signal TRP2 is detected, the data driving device may start to configure the equalizer in another time section in YES in step S1127 and in step S1113.

What is claimed is:

1. A display driving device comprising:
   a first circuit configured to receive a first signal having a first pattern and a second signal having a second pattern different from the first pattern; and
   a second circuit configured to set a communication circuit for receiving image data to a setting based on the first signal and to terminate the setting of the communication circuit based on the second signal, wherein
   the first circuit is configured to perform clock training on the first signal.

2. The display driving device of claim 1, wherein the first signal corresponds to a first frequency, and the second signal corresponds to a second frequency different from the first frequency.

3. The display driving device of claim 1, wherein the second circuit is configured to set the communication circuit to the setting based on the first signal, before receiving the image data.

4. The display driving device of claim 1, wherein the second circuit is configured to set a communication frequency of the communication circuit based on the first signal.

5. The display driving device of claim 1, wherein the first circuit is configured to restore data using a clock recovered by the clock training.

6. The display driving device of claim 5, wherein the first circuit is configured to identify whether sequence data included in the restored data matches a pre-stored bit string.

7. The display driving device of claim 6, wherein the first circuit is configured to identify a bit error rate (BER) for the sequence data included in the restored data.

8. The display driving device of claim 6, wherein the sequence data included in the restored data comprises pseudo random binary sequence (PRBS) data.

9. The display driving device of claim 1, wherein the first signal comprises a signal for training an equalizer included in the first circuit.

10. A method for transmitting image data in a display device, the method comprising:
   transmitting a first signal having a first pattern;
   transmitting a second signal having a second pattern different from the first pattern; and
   transmitting the image data through a communication circuit, wherein
   the communication circuit is configured to be set to a setting based on the first signal and the setting of the communication circuit is configured to be terminated based on the second signal, and
   clock training is performed on the first signal by a display data receiving device.

11. The method of claim 10, wherein the first signal corresponds to a first frequency, and the second signal corresponds to a second frequency different from the first frequency.

12. The method of claim 10, wherein the communication circuit is configured to be set to the setting based on the first signal, before transmitting the image data.

13. The method of claim 10, wherein a communication frequency of the communication circuit is set based on the first signal.

14. The method of claim 10, wherein the display data receiving device is configured to restore data using a clock recovered by the clock training.

15. The method of claim 14, wherein the display data receiving device is configured to identify whether sequence data included in the restored data matches a pre-stored bit string.

16. The method of claim 15, wherein the display data receiving device is configured to identify a bit error rate (BER) for the sequence data included in the restored data.

17. The method of claim 15, wherein the sequence data included in the restored data comprises pseudo random binary sequence (PRBS) data.

18. The method of claim 10, wherein the first signal comprises a signal for training an equalizer included in the display data receiving device.

19. A display driving device comprising:
   a first circuit configured to receive a first signal having a first pattern and a second signal having a second pattern different from the first pattern; and a second circuit configured to set a communication circuit for receiving image data to a setting based on the first signal and to terminate the setting of the communication circuit based on the second signal, wherein the first signal comprises a signal for training an equalizer included in the first circuit.

20. The display driving device of claim 19, wherein the first signal corresponds to a first frequency, and the second signal corresponds to a second frequency different from the first frequency.

* * * * *